(12) United States Patent
Ren et al.

(10) Patent No.: US 11,286,178 B2
(45) Date of Patent: Mar. 29, 2022

(54) FLUID TRANSPORTATION AND FILTERING CONTAINER

(71) Applicants: Nathanael Ren, Brookfield, WI (US); Noah Ren, Brookfield, WI (US); Aryan Saxena, Brookfield, WI (US); Vikram Malkan, Brookfield, WI (US); Chetan Malkan, Brookfield, WI (US); Alok Malkan, Brookfield, WI (US)

(72) Inventors: Nathanael Ren, Brookfield, WI (US); Noah Ren, Brookfield, WI (US); Aryan Saxena, Brookfield, WI (US); Vikram Malkan, Brookfield, WI (US); Chetan Malkan, Brookfield, WI (US); Alok Malkan, Brookfield, WI (US)

( * ) Notice: Subject to any disclaimer, the term of this patent is extended or adjusted under 35 U.S.C. 154(b) by 192 days.

(21) Appl. No.: 16/377,530

(22) Filed: Apr. 8, 2019

(65) Prior Publication Data

US 2020/0002187 A1    Jan. 2, 2020

Related U.S. Application Data

(60) Provisional application No. 62/691,929, filed on Jun. 29, 2018.

(51) Int. Cl.
*C02F 1/18* (2006.01)
*B01D 29/23* (2006.01)

(52) U.S. Cl.
CPC ............... *C02F 1/18* (2013.01); *B01D 29/23* (2013.01)

(58) Field of Classification Search
CPC ........ B01D 33/11; B01D 33/42; B01D 33/76; B01D 29/23; B01D 29/58; B01D 29/94; B01D 33/39; B01D 29/54; C02F 1/18; C02F 1/001; C02F 1/002; C02F 1/283; C02F 1/44; C02F 2201/008; C02F 2303/04; C02F 1/00; C02F 1/28; C02F 1/50; C02F 1/003
USPC ................................ 210/266, 754, 238, 764
See application file for complete search history.

(56) References Cited

U.S. PATENT DOCUMENTS

2014/0175024 A1*  6/2014  Schoepf ................. A01B 29/02
                                                           210/754

OTHER PUBLICATIONS

Clever Q Drum, 2011.*

(Continued)

*Primary Examiner* — Akash K Varma
(74) *Attorney, Agent, or Firm* — Foley & Lardner LLP

(57) ABSTRACT

A fluid transport assembly includes a substantially cylindrical shell having a first closed end and a second closed end and a tube extending from the first closed end to the second closed end. The tube is substantially aligned with an axis of the shell and provides a passage through the shell. The fluid transport assembly also includes a series of concentric cylindrical filters positioned in the cylindrical shell and extending from the first closed end to the second closed end. The series of concentric cylindrical filters defines an input compartment between the filters and the tube and an output compartment between the filters and the cylindrical shell. The series of concentric filters is structured to remove contaminants from a fluid as the fluid flows through the series of concentric filters from the input compartment to the output compartment.

20 Claims, 5 Drawing Sheets

(56) References Cited

OTHER PUBLICATIONS

Macguire, Eoghan, "Wind Turbine Creates Water from Thin Air", CNN, Apr. 30, 2012, https://www.cnn.com/2012/04/29/world/eole-water-turbine/index.html, 4 pages.
Q Drum, "Clever Q Drum", 2011, https://www.qdrum.co.za/about-q-drum, 3 pages.
Wikipedia, "LifeSaver Bottle", Apr. 10, 2018. https://en.wikipedia.org/w/index.php?title=LifeSaver_bottle&oldid=835726057, 3 pages.

* cited by examiner

FLUID TRANSPORTATION AND FILTERING CONTAINER

CROSS-REFERENCE TO RELATED APPLICATION

This application claims the benefit of and priority to U.S. Provisional Patent Application No. 62/691,929, filed Jun. 29, 2018, the entire disclosure of which is incorporated by reference herein.

BACKGROUND

Millions and millions of people worldwide lack access to clean drinking water. Often, water is only accessible via a stream, well, etc. located far away from a dwelling of a person or family that needs drinking water. Adding to the challenge of obtaining clean drinking water, the water accessible from such sources is often dirty and contaminated with bacteria, viruses, spores, parasites, other microorganisms. Without clean water, people are susceptible to disease, malnutrition, dehydration, and other health problems. Further, the physical burden and time-consuming nature of fetching and cleaning water takes a toll on people both directly (i.e., injuries and exhaustion relating to the physical demands of fetching water) as well as in terms of opportunities for other work or leisure lost to the time spent attempting to acquire clean water.

SUMMARY

One implementation of the present disclosure is a fluid transport assembly. The fluid transport assembly includes a substantially cylindrical shell having a first closed end and a second closed end and a tube extending from the first closed end to the second closed end. The tube is substantially aligned with an axis of the shell and provides a passage through the shell. The fluid transport assembly also includes a series of concentric cylindrical filters positioned in the cylindrical shell and extending from the first closed end to the second closed end. The series of concentric cylindrical filters defines an input compartment between the filters and the tube and an output compartment between the filters and the cylindrical shell. The series of concentric filters is structured to remove contaminants from a fluid as the fluid flows through the series of concentric filters from the input compartment to the output compartment.

Another implementation of the present disclosure is a method of manufacturing a fluid transport assembly. The method includes forming a substantially cylindrical shell having a first end and a second end and coupling a tube to the closed end substantially aligned with an axis of the shell. The tube extends from the first end to the second end and provides a passage therebetween for a pulling device (e.g., a rope). The method also includes positioning a series of concentric cylindrical filters in the cylindrical shell. The series of concentric cylindrical filters define an input compartment between the series of filters and the tube and an output compartment between the series of filters and the cylindrical shell. The series of filters is structured to remove contaminants from a fluid as the fluid flows through the series of filters from the input compartment to the output compartment.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Referring generally to the FIGURES, a fluid transport device structured to facilitate transportation of fluid while simultaneously purifying the fluid is shown, according to exemplary embodiments. The fluid transport device described herein provides an integrated mechanism for addressing two of the main challenges of providing clean water to vulnerable populations, namely difficulties associated with transportation of water across rugged terrain (e.g., time consumption and physical strain) and difficulties associated with purifying contaminated water.

In various other embodiments, the fluid transport device provides transportation and filtration of various other fluids (e.g., solutions, chemicals, oils, mixtures, etc.) and the various contaminants found therein, for example for use in chemical plants, warehouses, factories, power plants, mining, etc. For some applications, the fluid transport device may thus provide advantages over other fluid containers in which transportation (e.g., jostling, rotation, vibrations, etc.) causes mixing of any fluids or particulates stored together in the container.

As described in detail below, the fluid transport device is structured to contain and filter fluid while being rolled across rugged terrain under human power. Advantageously, the fluid transport device includes a rubber or rubber-like outer surface with a tire-like tread that facilitates rolling of the fluid transport device over rugged terrain (e.g., rocks, gravel, sand, mud, roots, logs, sticks, thorns). Meanwhile, the fluid contained within the fluid transport device passes through a self-cleaning filtration system of the fluid transport device while the fluid is being transported. More particularly, a centrifugal force created by the rolling motion of the fluid transport device in transit may cause the fluid to flow outwardly through one or more filters. Thus, by the time the fluid transport device arrives at a destination, the fluid transport device contains filtered (e.g., purified) fluid.

Figure 1:
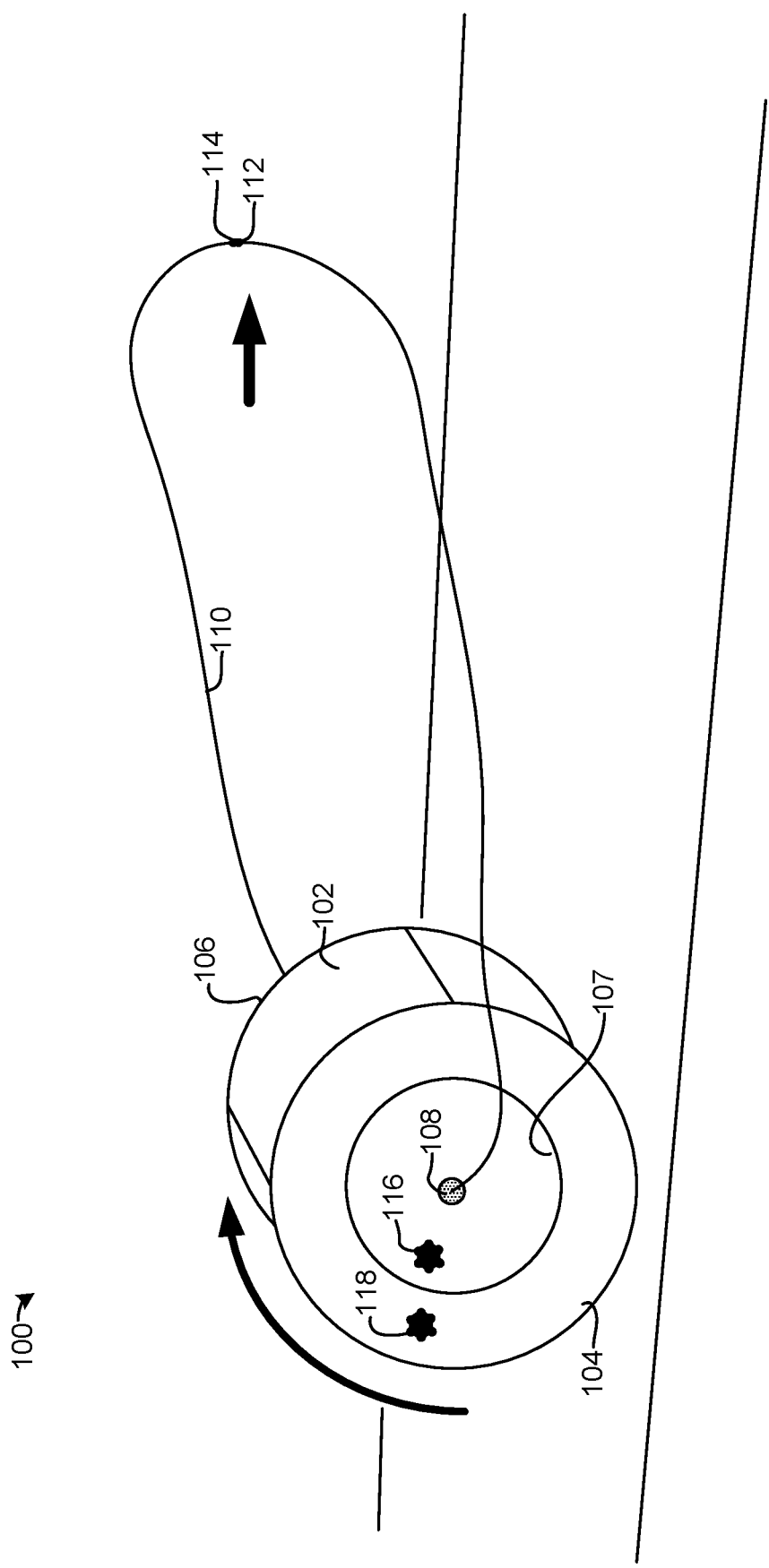
FIG. 1 is a perspective view of a fluid transport device in transit, according to an exemplary embodiment.

Referring to FIG. 1, a perspective view of the fluid transport device 100 in transit is shown, according to an exemplary embodiment. The fluid transport device 100 includes a substantially cylindrical shell 102 with a first closed end 104 and a second closed end 106. A passage 108 extends from the first closed end 104 to the second closed end 106 and is substantially aligned with a central axis of the shell 102. The first closed end 104 may include a lid 107 that is removable from the shell 102 to provide access to an input compartment and/or a series of concentric filters, described in detail below.

A rope 110 extends through the passage 108. A first end 112 of the rope 110 and a second end 114 of the rope 110 are joined together with a knot or fastener to form the rope 110 into a loop. As illustrated by arrows in FIG. 1, the rope 110 can be pulled to cause the shell 102 to roll along a surface, for example a road or path. According to various other embodiments, other pulling devices (e.g., wires, frames, rods, handles, etc.) may extend through the passage 108 to facilitate pulling or pushing of the shell 102.

As shown in FIG. 1, the fluid transport device 100 includes an inlet cap 116 positioned on the first closed end 104 and removable from the first closed end 104 to reveal an inlet through which dirty (unpurified, contaminated, unsafe) fluid can be input to an input chamber of the fluid transport device 100 from a fluid source. The fluid transport device 100 also includes an outlet cap 118 positioned on the first closed end 104 and removable from the first closed end 104 to reveal an outlet through which clean fluid can be removed from an output chamber of the fluid transport device 100. As described in detail below, a series of concentric filters separates the input chamber from the output chamber, such that fluid input through the inlet must traverse the series of concentric filters to reach the outlet.

Thus, as illustrated by FIG. 1, the fluid transport device 100 may be operated using the following intuitive, user-friendly, minimal-effort workflow. First, dirty fluid from a fluid source is input to the fluid transport device 100 via the inlet under the inlet cap 116. Next, the rope 110 is pulled to roll the fluid transport device 100 from the fluid source to a destination, for example a dwelling of a user. While the shell 102 is rolling, the fluid passes through a series of concentric filters positioned in the shell and described in detail below, filtering contaminants such as parasites, bacteria, and viruses out of the fluid. When the fluid transport device 100 reaches its destination, the outlet cap 118 is removed from the first closed end 104 to allow clean fluid to be removed from the fluid transport device 100 via the outlet. In an embodiment where the fluid is water for domestic use, a user may then drink the clean water or use the clean water for some other purpose (e.g., cooking, cleaning).

Figure 2:
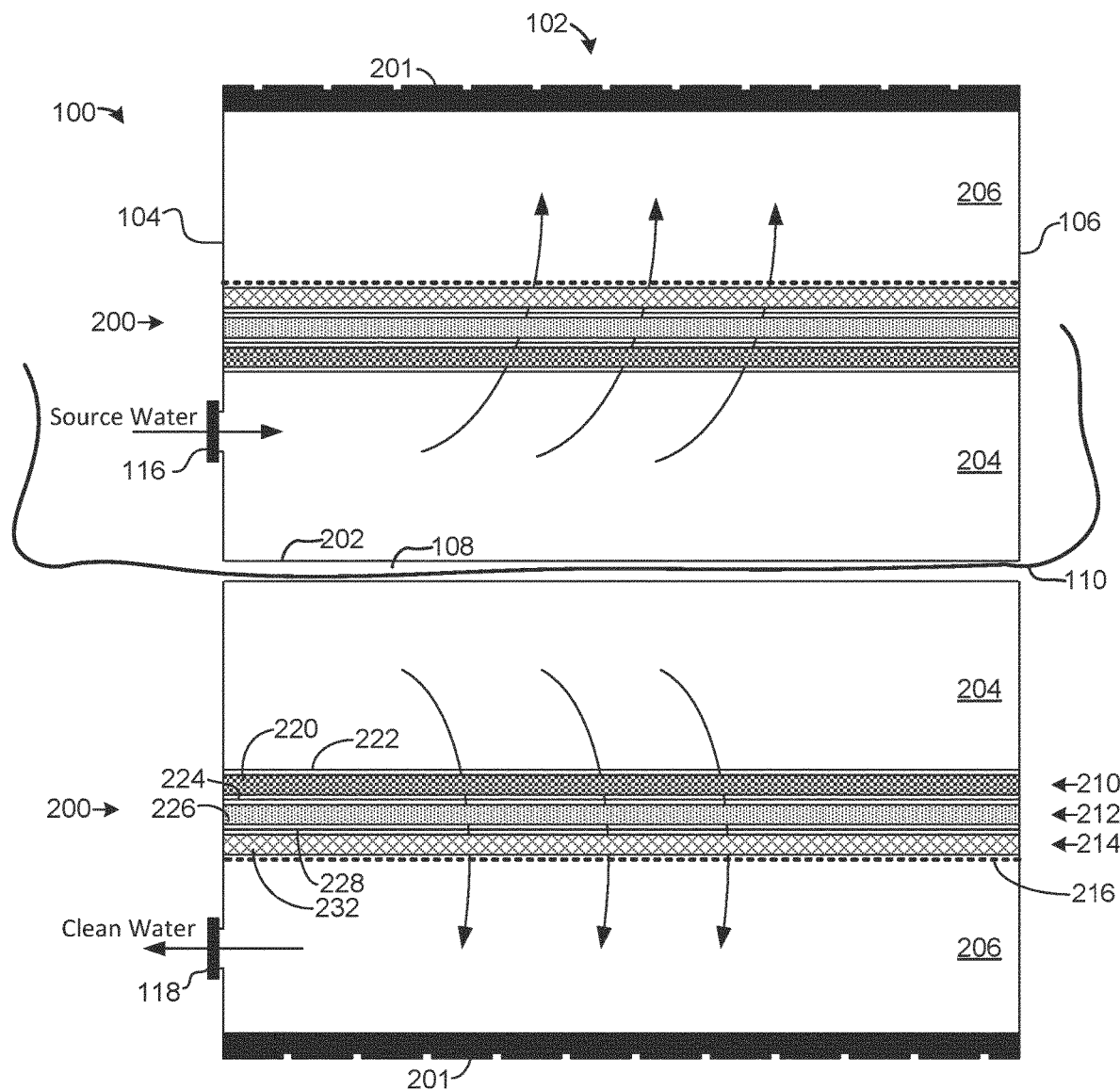
FIG. 2 is a cross-sectional view of the fluid transport device of FIG. 1, according to an exemplary embodiment.

Referring now to FIG. 2, a cross-sectional view of the fluid transport device 100 is shown, according to an exemplary embodiment.

As shown in FIG. 2, the fluid transport device 100 includes a tread 201 defining the outside surface of the shell 102. The tread 201 is a tire-like rubber surface that facilitates rolling of the fluid transport device 100 along rugged terrain. Accordingly, the shell 102 may include a tire-like (e.g., rubber, synthetic rubber) material that allows the shell 102 to be deflated (e.g., compressed, folded, collapsed) for transport or storage when not in use and reformed in the configuration shown in FIG. 2 when filled or partially filled with fluid as described herein. The tread 201 provides a soft, compressible surface that absorbs impacts between the shell 102 and rocks, roots, or other obstacles while also providing sufficient rigidity to maintain the wheel-like shape of the cylindrical shell 102 to facilitate rolling of the shell 102. The tread 201 may include knobs or other protrusions that improve the grip between a surface and the shell 102 that facilitates rolling of the shell 102 along the surface, which may be particularly useful in sandy or muddy conditions. That is, the tread 201 increases the likelihood that a force applied to the rope 110 will cause the shell 102 to roll as opposed to slide across a surface. Because the work required to roll a cylindrical object across a distance is typically substantially less than sliding the object across the, the tread 201 thereby decreases the challenge of transporting the fluid transport device 100.

The fluid transport device 100 also includes a series of concentric filters 200 positioned in the shell 102 and extending from the first closed end 104 to the second closed end 106. The series of concentric filters 200 define an input compartment 204 between the series of concentric filters 200 and a tube 202 that defines the passage 108. The series of concentric filters 200 also defines an output compartment 206 between the series of concentric filters 200 and the shell 102 (i.e., between the series of concentric filters 200 and the tread 201). The series of concentric filters 200 abuts the first closed end 104 and the second closed end 106 such that fluid and contaminants are prevented from flowing from the input compartment 204 to the output compartment 206 without passing through the series of concentric filters 200.

It should be understood that the sizes, dimensions, relative dimensions, etc. of the output compartment 206, input compartment 204, shell 102, and other elements described herein are highly configurable and scalable for various implementations. For example, in some embodiments, the series of concentric filters 200 may be positioned such that the volume of the output compartment 206 is approximately equivalent to the volume of the input compartment 204. In various other embodiments, the input compartment 204 and the output compartment 206 have unequal volumes.

In the embodiment shown, the series of concentric filters 200 includes a gravel filter 210, a sand filter 212, a charcoal filter 214, and a membrane filter 216. It should be understood that the series of concentric filters 200 shown and described herein is included for illustrative purposes and that various combinations of various types of filters of various dimensions for various applications are contemplated by the present disclosure. The gravel filter 210, the sand filter 212, the charcoal filter 214, and the membrane filter 216 are each substantially cylindrical and extend from the first closed end 104 to the second closed end 106. The gravel filter 210 is positioned along the input compartment 204, the sand filter 212 surrounds the gravel filter 210, the charcoal filter 214 surrounds the sand filter 212, and the membrane filter 216 surrounds the charcoal filter 214. Accordingly, fluid flowing from the input compartment 204 to the output compartment 206 must flow sequentially through the gravel filter 210, the sand filter 212, the charcoal filter 214, and the membrane filter 216 to reach the output compartment 206. In various other embodiments, the filters 210-216 are arranged in various other orders.

The gravel filter 210 filters macroscopic debris and contaminants out from fluid that passes through the gravel filter 210. The gravel filter 210 includes gravel 220 positioned between a first barrier 222 and a second barrier 224. The first barrier 222 and the second barrier 224 are substantially cylindrical and are spaced apart to define a thickness of the gravel filter 210. That is, the second barrier 224 has a slightly larger radius than the first barrier 222. For example, in the embodiment shown, the first barrier 222 and the second barrier 224 are approximately one inch apart. Gravel 220 is placed between the first barrier 222 and the second barrier 224, such that the gravel 220 settles between the first barrier 222 and the second barrier 224 with a thickness of approximately one inch. The first barrier 222 may be a net, grate, membrane, etc. that allows fluid to flow therethrough but prevents gravel 220 from passing therethrough. That is, the first barrier 222 has holes, gaps, perforations etc. smaller than the size of individual pieces of gravel 220.

The gravel 220 may include any type of stone or rock, for example a type of gravel readily available in a region where there the fluid transport device 100 is to be used or manufactured. In some cases, the gravel 220 is installed in the fluid transport device 100 at a manufacturing facility before distribution to uses. In other embodiments, the fluid transport device 100 is configured to allow a user to insert the gravel 220 at the point of use, substantially decreasing material and shipping costs. For example, the first closed end 104 may be a removable lid that can be removed to provide access to the volume between the first barrier 222 and the second barrier 224 into which gravel 220 may be added. This may also allow the user to periodically replace the gravel 220 as needed to clean the gravel filter 210 or otherwise maintain the fluid transport device 100.

The sand filter 212 filters another set debris and contaminants out from fluid that passes through the sand filter 212 (e.g., debris and contaminants small enough to make it through the gravel filter 210. The sand filter 212 includes sand 226 positioned between the second barrier 224 and a third barrier 228. The third barrier 228 is also substantially cylindrical, with a radius slightly larger than the radius of the second barrier 424 (e.g., approximately one inch larger). Sand 230 is positioned between the second barrier 224 and the third barrier 228, for example such that the sand 230 has an approximate thickness of one inch in the embodiment shown. The second barrier 224 may be a net, grate, membrane, etc. that allows fluid to flow therethrough but prevents gravel 220 and sand 226 from passing therethrough. That is, the second barrier 224 has holes, gaps, perforations, etc. smaller than the size of individual grains of sand 226.

The sand 226 may include any type of sand (i.e., crushed rock), for example a type of sand readily available in a region where there the fluid transport device 100 is to be used or manufactured. In some cases, the sand 226 is installed in the fluid transport device 100 at a manufacturing facility before distribution to uses. In other embodiments, the fluid transport device 100 is configured to allow a user to insert the sand 226 at the point of use, substantially decreasing material and shipping costs. For example, the first closed end 104 may be a removable lid that can be removed to provide access to the volume between the second barrier 224 and the third barrier 228 into which sand 226 may be added. This may also allow the user to periodically replace the sand 226 as needed to clean the sand filter 212 or otherwise maintain the fluid transport device 100.

The charcoal filter 214 filters bacteria and other microorganisms from the fluid that passes through the charcoal filter 214. The charcoal filter 214 includes charcoal 232 with microscopic pores (e.g., with a diameter on the order of 1 micron) that prevents bacteria, parasites, etc. from passing therethrough. The charcoal filter 214 may also include one or more elements, ions, or chemicals with antibacterial properties to kill or otherwise negatively affect microorganisms. The charcoal filter 214 thereby prevents bacteria and other microorganisms from crossing the charcoal filter 214.

The charcoal 232 is positioned between the third barrier 228 and the membrane filter 216. In some embodiments, the charcoal 232 is provided one continuous piece or a limited number (e.g., 2, 3, 4, 8) of solid pieces that combine to form a cylindrical shape. In other embodiments, many (e.g., 50, 100, 200) smaller chunks of charcoal 232 are positioned between the third barrier 228 and the membrane filter 216. Accordingly, the third barrier 228 is configured to keep the charcoal 232 separated from the sand 226. The charcoal may be installed in a manufacturing facility or may be installed by a user.

The membrane filter 216 is configured to filter viruses and other microscopic contaminants out of fluid that passes through the membrane filter 216. The membrane filter 216 includes a material with very small holes (perforations, slits, etc.), for example with a diameter of approximately 0.01 micron or on the order of 0.01 micron (e.g., 15 nanometers, 30 nanometers). The membrane filter 216 thereby prevents contaminants larger than approximately 0.01 micron from passing into the output compartment 206 while allowing the flow of fluid through the membrane filter 216 to the output compartment 206.

As illustrated in FIG. 2, fluid introduced into the input compartment 204 encounters the gravel filter 210, the sand filter 212, the charcoal filter 214, and the membrane filter 216 in sequence as it flows towards the output compartment 206. The gravel filter 210 removes the largest, macroscopic debris from the fluid. The sand filter 212 removes slightly smaller debris and contaminants from the fluid. The charcoal filter 214 removes bacteria and other microscopic contaminants from the fluid. The membrane filter 216 removes viruses and other nanometer-scale contaminants from the fluid. Thus, the series of concentric filters 200 allows only filtered fluid to enter the output compartment 206.

In some embodiments, the series of concentric filters 200 is structured to prevent fluid from flowing from the output compartment 206 into the input compartment 204. In other embodiments, fluid is allowed to repeatedly flow back-and-forth through the series of concentric filters 200. In some embodiments, a centrifugal force created by rotation (e.g., spinning) shell 102 forces fluid towards the outside of the shell 102, pushing through the fluid through series of concentric filters 200 and into the output compartment 206. In some embodiments, other forces created by the rotation and jostling of the shell 102 as the shell 102 rolls along in transit from the fluid source to a destination creates forces that drive the fluid through the series of concentric filters 200 (e.g., a gravitational force, an inertial resistance, etc., or some combination thereof).

Figure 3:
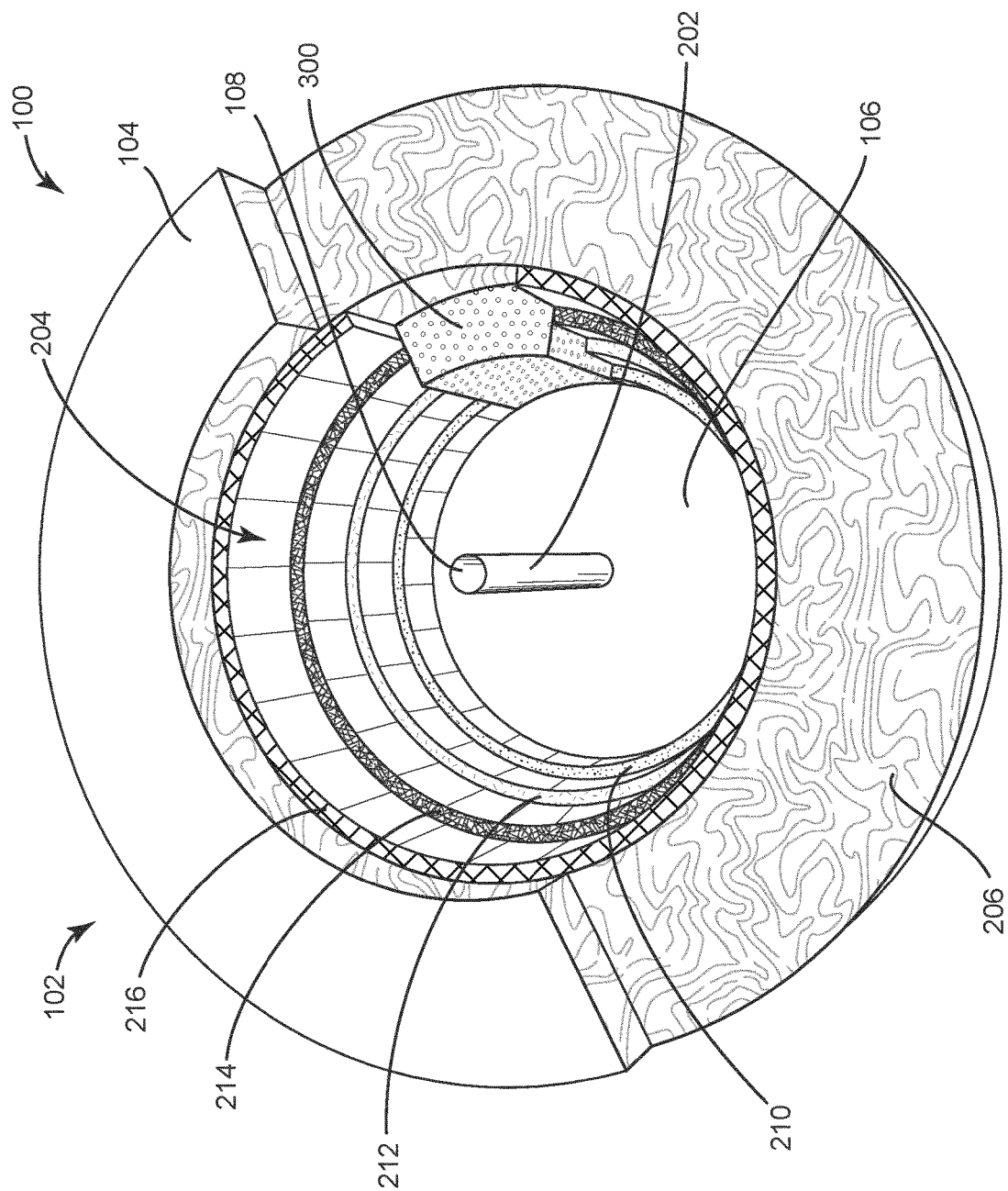
FIG. 3 is a first perspective cut-away view of the fluid transport device of FIG. 1, according to an exemplary embodiment.
Figure 4:
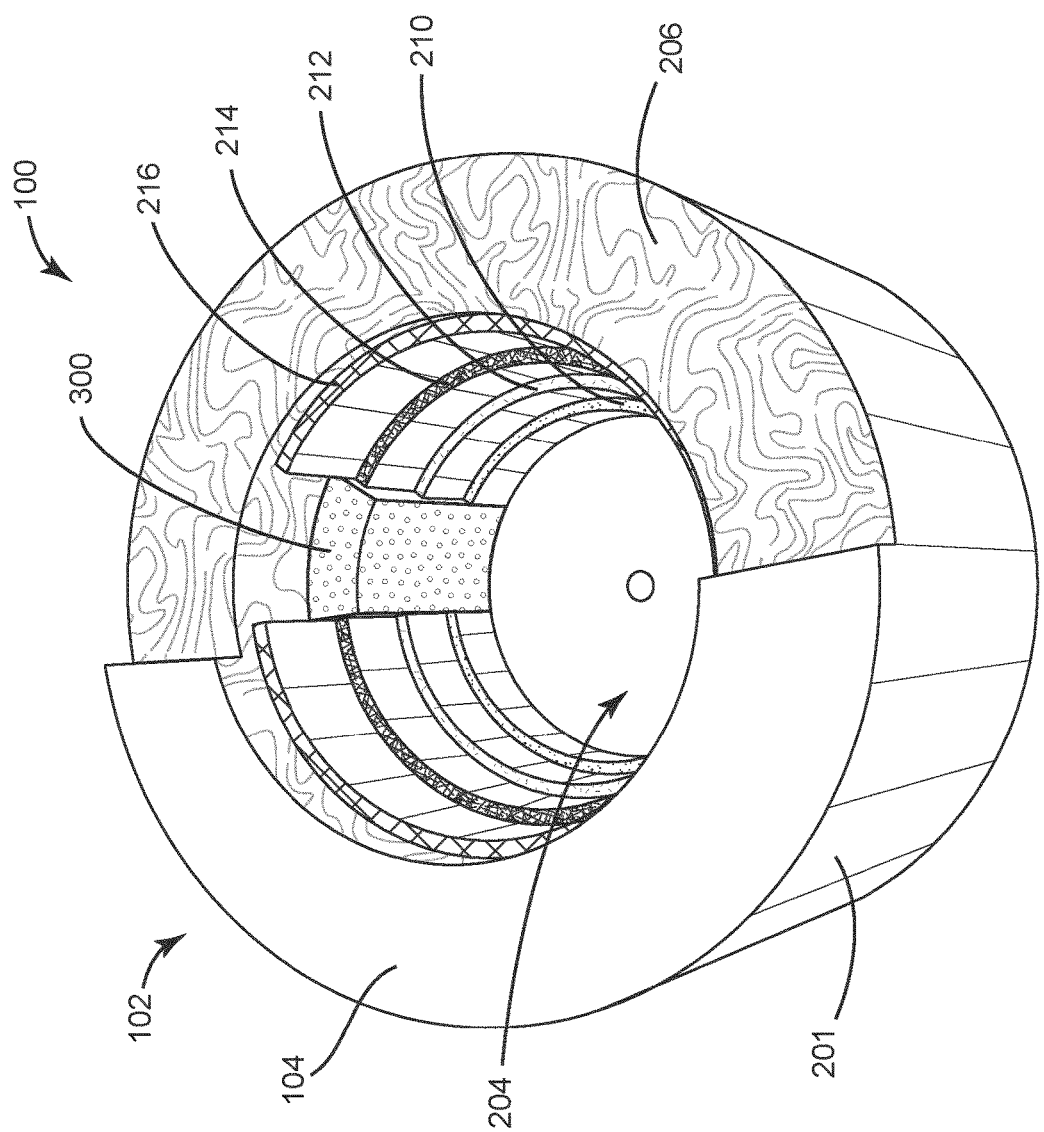
FIG. 4 is a second perspective cut-away view of the fluid transport device of FIG. 1, according to an exemplary embodiment.
Figure 5:
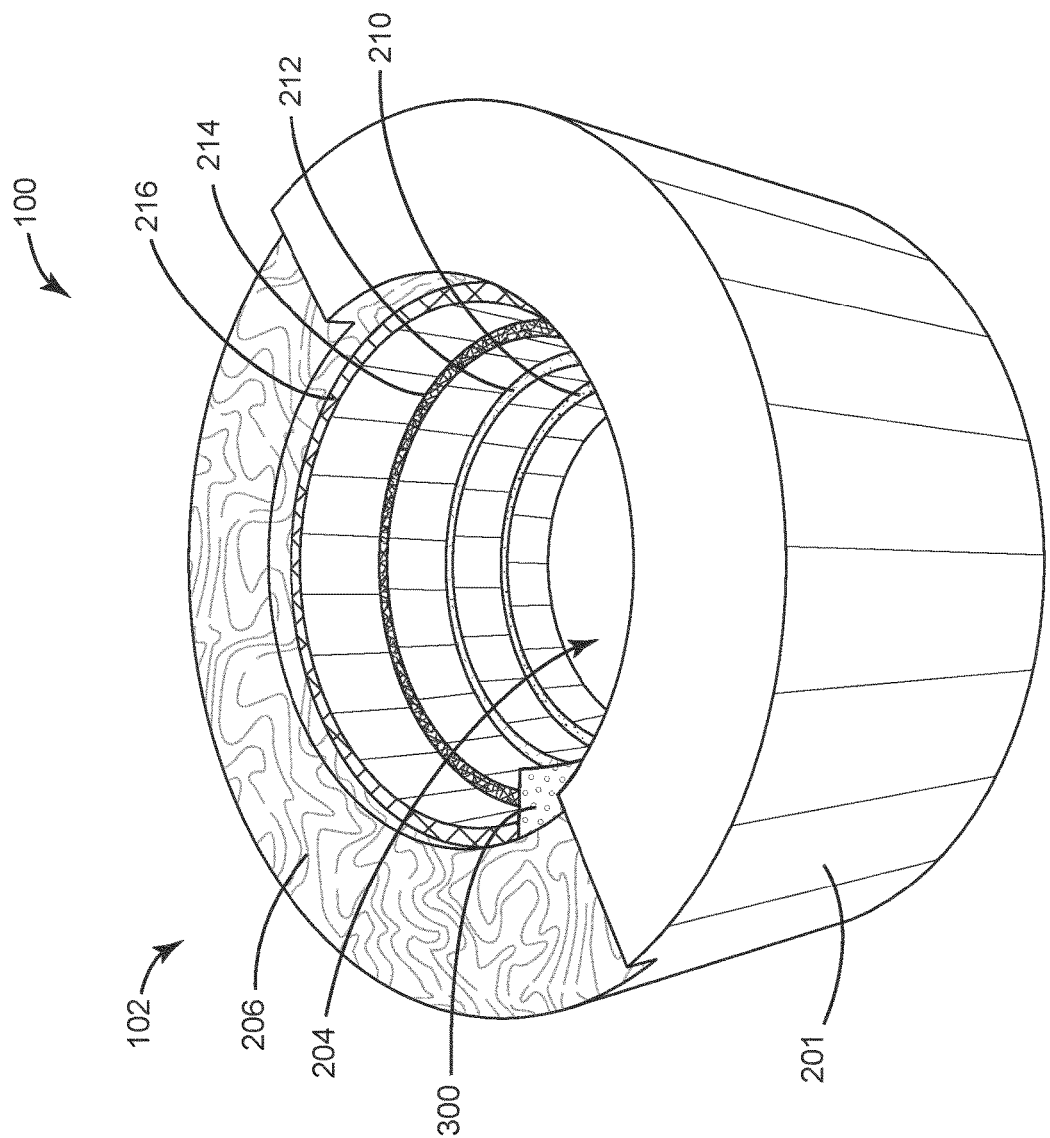
FIG. 5 is a third perspective cut-away view of the fluid transport device of FIG. 1, according to an exemplary embodiment.

Referring now to FIGS. 3-5, several perspective cut-away views of the fluid transport device 100 are shown, according to an exemplary embodiment. As shown in FIGS. 3-5, the fluid transport device 100 includes shell 102 that extends from the first closed end 104 to the second closed end 106. The tread 210 forms the outer periphery of the shell 102. The tube 202 extends through the input compartment 204 and provides the passage 108 for the rope 110.

As shown, the lid 107 is removed, providing a user access to the input compartment 204, the gravel filter 210, the sand filter 212, the charcoal filter 214, and the membrane filter 216, allowing the user to fill, clean, etc. the input compartment 204 and the filters 210-216.

In the embodiment of FIGS. 3-5, the fluid transport device 100 also includes a debris trap 300. The debris trap 300 collects the debris and contaminants (e.g., dirt, bacteria, parasites, viruses) filtered from the fluid by the filters 210-216. The debris trap 300 is aligned with the series of concentric filters 200, facilitating the flow of contaminants from each of the filters 210-216 into the debris trap 300. In some embodiments, the debris trap 300 includes a superhydrophobic coating that substantially prevents water (or, in alternative embodiments, another fluid) from entering the debris trap 300. The debris trap 300 also includes a plurality of one-way gates or valves structured to allow debris and contaminants to enter the debris trap 300 but not escape the debris trap 300. As fluid flows and sloshes around in the shell 102, the debris and contaminants pass into the debris trap 300 and are confined therein. The debris trap 300 may thereby collect substantially all of the debris and contaminants removed from the fluid by the filters 210-216.

In some embodiments, the debris trap 300 is removable from the fluid transport device 100 to facilitate disposal of debris from the debris trap 300. In other embodiments, the debris trap 300 is fixedly coupled to the shell 102 (e.g., to the second closed end 106) and includes a cap, door, lid, etc. that allows access to the interior of the debris trap 300 to facilitate removal of debris from the debris trap 300. The debris trap 300 thereby facilitates easy cleaning and maintenance of the fluid transport device 100. Additionally, by collecting all contaminants from a fluid source in the debris trap 300, the debris trap 300 provides robust samples that may be tested and analyzed to determine the risks and issues associated with the fluid source.

The fluid transport device 100 thus provides improved, efficient filtration of fluid while facilitating transportation of the fluid from a fluid source to a destination, for example a dwelling of a user. In some applications, the fluid transportation device 100 thereby reduces the risks of water-borne diseases or parasites while simultaneously reducing the time and effort required to fetch and purify water. The fluid transportation device 100 may thereby improve the health and wellbeing of its users and their families, potentially drastically improving the human condition for vulnerable populations across various geographies.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and are considered to be within the scope of the disclosure.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Other arrangements and combinations of the elements described herein and shown in the Figures are also contemplated by the present disclosure. The construction and arrangement of the systems and apparatuses as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. Other substitutions, modifications, changes, and omissions can be made in the design, operating conditions and arrangement of the exemplary embodiments without departing from the scope of the present disclosure.

What is claimed is:

1. A fluid transport assembly, comprising:
    a substantially cylindrical shell having a first closed end and a second closed end;
    a tube extending from the first closed end to the second closed end, the tube substantially aligned with an axis of the substantially cylindrical shell and providing a passage through the substantially cylindrical shell;
    a series of concentric cylindrical filters positioned in the substantially cylindrical shell and extending from the first closed end to the second closed end, the series of concentric cylindrical filters defining an input compartment between the series of concentric cylindrical filters and the tube and an output compartment between the series if concentric cylindrical filters and the cylindrical shell;
    wherein the series of concentric cylindrical filters is structured to remove contaminants from a fluid as the fluid flows through the series of concentric cylindrical filters from the input compartment to the output compartment.

2. The fluid transport assembly of claim 1, further comprising a debris trap aligned with the series of concentric cylindrical filters, the debris trap configured to collect the contaminants removed from the fluid.

3. The fluid transport assembly of claim 2, wherein the debris trap comprises a super-hydrophobic coating and one or more one-way gates, the one or more one-way gates structured to allow contaminants to pass into the debris trap and prevent contaminants from escaping the debris trap.

4. The fluid transport assembly of claim 3, wherein the debris trap is removable from the substantially cylindrical shell to facilitate removal of debris from the debris trap.

5. The fluid transport assembly of claim 1, wherein the series of concentric cylindrical filters comprises:
    a gravel filter that comprises gravel contained between a first barrier and a second barrier;

a sand filter surrounding the gravel filter, the sand filter comprising sand contained between the second barrier and a third barrier;

a charcoal filter surrounding the sand filter, the charcoal filter comprising charcoal contained between the third barrier and a membrane filter; and the membrane filter surrounding the charcoal filter and comprising a membrane having perforations that extend therethrough, each perforation having a diameter of approximately fifteen nanometers.

6. The fluid transport assembly of claim 5, further comprising a lid, the lid removable to allow a user to add, remove, and replace the gravel and the sand.

7. The fluid transport assembly of claim 1, wherein the fluid comprises water and wherein the series of concentric filters is structured to remove bacteria, viruses, and parasites from the fluid.

8. The fluid transport assembly of claim 1, further comprising:
an inlet extending through the first closed end or the second closed end and aligned with the input compartment, the inlet configured to allow introduction of contaminated fluid to the input compartment; and
an outlet extending through the first closed end or the second closed end and aligned with the output compartment, the outlet configured to allow removal of purified fluid from the output compartment.

9. The fluid transport assembly of claim 1, wherein the substantially cylindrical shell is manufactured from rubber and the substantially cylindrical shell comprises a tread that facilitates rolling of the substantially cylindrical shell over rugged terrain.

10. The fluid transport assembly of claim 9, further comprising a rope extending through the passage;
wherein the rope is pullable by a user to roll the fluid transport assembly along a surface.

11. A method of manufacturing a fluid transport assembly, comprising:
forming a substantially cylindrical shell having a first end and a second end;
coupling a tube to the first end and the second end, the tube substantially aligned with an axis of the substantially cylindrical shell, the tube extending from the first end to the second end and providing a passage therebetween; and
positioning a series of concentric cylindrical filters in the substantially cylindrical shell and extending from the first end to the second end, the series of concentric cylindrical filters defining an input compartment between the series of concentric cylindrical filters and the tube and an output compartment between the series of concentric cylindrical filters and the substantially cylindrical shell;
wherein the series of concentric cylindrical filters is structured to remove contaminants from a fluid as the fluid flows through the series of concentric cylindrical filters from the input compartment to the output compartment.

12. The method of claim 11, further comprising installing a debris trap aligned with the series of concentric cylindrical filters, the debris trap configured to collect the contaminants removed from the fluid.

13. The method of claim 12, further comprising coating the debris trap with a super-hydrophobic coating and providing the debris trap with one or more one-way gates, the one or more one-way gates structured to allow contaminants to pass into the debris trap and prevent contaminants from escaping from the debris trap.

14. The method of claim 12, wherein the debris trap is removable from the substantially cylindrical shell to facilitate removal of debris from the debris trap.

15. The method of claim 11, wherein positioning the series of concentric cylindrical filters in the substantially cylindrical shell comprises:
installing a first barrier, a second barrier surrounding the first barrier, a third barrier surrounding the second barrier, and a membrane filter surrounding the third barrier;
positioning gravel between the first barrier and the second barrier;
positioning sand between the second barrier and the third barrier; and
positioning charcoal between the third barrier and the membrane filter;
wherein the membrane filter comprises a membrane having perforations that extend therethrough, each perforation having a diameter of approximately fifteen nanometers.

16. The method of claim 11, wherein the fluid comprises water and wherein the series of concentric filters is configured to remove bacteria, viruses, and parasites from the water.

17. The method of claim 11, further comprising sealing a lid over the first end to enclose the input compartment and the output compartment by aligning an inlet extending through the lid with the input compartment and an outlet extending through the lid with the output compartment.

18. The method of claim 11, wherein forming the substantially cylindrical shell comprises molding the substantially cylindrical shell from a food-safe rubber or synthetic rubber.

19. The method of claim 18, wherein molding the substantially cylindrical shell from the food-safe rubber or synthetic rubber comprises forming an outer tread on an exterior of the substantially cylindrical shell that facilitates rolling of the substantially cylindrical shell over rugged terrain.

20. The method of claim 11, further comprising:
threading a rope through the tube; and
securing a first end of the rope to a second end of the rope;
wherein the rope is pullable by a user to roll the substantially cylindrical shell along a surface.

* * * * *